(12) United States Patent
Bildgen et al.

(10) Patent No.: US 8,789,165 B2
(45) Date of Patent: Jul. 22, 2014

(54) METHOD FOR DETECTING POTENTIALLY SUSPICIOUS OPERATION OF AN ELECTRONIC DEVICE AND CORRESPONDING ELECTRONIC DEVICE

(75) Inventors: Marco Bildgen, Habere-Poche (FR); Jean Devin, Le Tholonet (FR)

(73) Assignees: STMicroelectronics (Rousset) SAS, Rousset (FR); STMicroelectronics N.V., Amsterdam (NL)

( * ) Notice: Subject to any disclaimer, the term of this patent is extended or adjusted under 35 U.S.C. 154(b) by 327 days.

(21) Appl. No.: 13/027,834

(22) Filed: Feb. 15, 2011

(65) Prior Publication Data

US 2011/0202948 A1 Aug. 18, 2011

(30) Foreign Application Priority Data

Feb. 16, 2010 (EP) .................................... 10305155

(51) Int. Cl.
| | |
|---|---|
| G06F 21/00 | (2013.01) |
| H04L 29/06 | (2006.01) |
| H04N 7/167 | (2011.01) |
| H04N 7/20 | (2006.01) |
| G06F 15/16 | (2006.01) |
| H04B 1/16 | (2006.01) |
| H04M 11/00 | (2006.01) |

(52) U.S. Cl.
USPC .............. 726/17; 725/14; 725/17; 380/227; 713/168; 713/322

(58) Field of Classification Search
USPC ......... 726/17; 725/14, 63; 380/227; 713/168, 713/322
See application file for complete search history.

(56) References Cited

U.S. PATENT DOCUMENTS

| | | | |
|---|---|---|---|
| 7,644,429 B2 * | 1/2010 | Bayassi et al. | 725/63 |
| 7,684,567 B2 * | 3/2010 | Maillard et al. | 380/227 |

FOREIGN PATENT DOCUMENTS

| | | |
|---|---|---|
| EP | 1447976 A1 | 8/2004 |
| EP | 1575293 A1 | 9/2005 |
| EP | 1742474 A1 | 1/2007 |
| FR | 2907930 A1 | 5/2008 |
| JP | 2012034231 A * | 2/2012 |
| WO | WO 03/092264 A1 | 11/2003 |

OTHER PUBLICATIONS

Gerhard P. Hancke, Markus G. Kuhn; "Attacks on time-of-flight distance bounding channels"; Mar. 2008; WiSec '08: Proceedings of the first ACM conference on Wireless network security; Publisher: ACM; pp. 194-202.*

Francis et al., "Countermeasures for Attacks on Satellite TV Cards Using Open Receivers," Nov. 6, 2004, Australasian Information Security Workshop: Digital Rights Management, pp. 1-6.

* cited by examiner

Primary Examiner — Kambiz Zand
Assistant Examiner — Courtney Fields
(74) Attorney, Agent, or Firm — Allen, Dyer, Doppelt, Milbrath & Gilchrist, P.A.

(57) ABSTRACT

A method may be for detecting potentially suspicious operation of an electronic device configured to operate in the course of activity sessions. The method may include within the device, a metering, from an initial instant of the number of activity sessions having a duration below a first threshold, and a comparison of this number with a second threshold.

26 Claims, 7 Drawing Sheets

ECM, ECM1, ECM2, ECM3, ECM, ECM1, ECM2, ECM3, ECM

FIG. 4

ECM, ECM1, ECM2, ECM3, RST, ECM, ECM1, ECM2, ECM3, RST, ECM,...

METHOD FOR DETECTING POTENTIALLY SUSPICIOUS OPERATION OF AN ELECTRONIC DEVICE AND CORRESPONDING ELECTRONIC DEVICE

FIELD OF THE INVENTION

The present disclosure relates to electronic devices, in particular, microcircuit cards or integrated circuit (IC) cards, and especially to the detection of potentially suspicious operation of such an electronic device.

BACKGROUND OF THE INVENTION

Electronic devices, in particular integrated circuit (IC) cards (Chip cards), and systems using such electronic devices may be subjected to attacks aimed in particular at diverting them from their normal use and/or at detecting part of their stored content.

SUMMARY OF THE INVENTION

The present disclosure may apply advantageously, but not in a limiting manner, to pay television systems and, more particularly, to the detection of "card sharing," i.e. allowing several users to watch pay television channels using just a single authorized IC card.

According to an embodiment, it is possible to detect, in a particularly simple manner, potentially suspicious operation of an electronic device. In particular, this detection may be performed within the device, that is to say the device can itself detect potentially suspicious operation.

According to an aspect, a method is for detecting potentially suspicious operation of an electronic device configured to operate in the course of activity sessions. The method may comprise metering or measuring, from an initial instant, the number of activity sessions having a duration below a first threshold, and comparing this number with a second threshold. Advantageously, an abnormally high number of relatively short activity sessions could, in the majority of cases, be indicative of potentially suspicious operation of the electronic device. This may be the case for microcircuit cards or IC cards usable in pay television systems subjected to attacks of the "card sharing" type, or else during attacks of an IC card by fault injection.

According to one embodiment, the device may be configured to operate in a first mode of operation, typically a normal mode of operation, in the course of the activity sessions. The method may comprise a switching of the device to at least one second mode of operation different from the first mode of operation if the number of sessions is above a second threshold.

This second mode of operation may be a degraded operating mode in which the performance of the device is impaired. The first temporal threshold, fixing the duration of the activity sessions, as well as the second threshold, fixing the number of activity sessions having a duration below the first threshold, may depend of course on the applications. For example, in a pay television application, it is possible to choose a first threshold equal to one minute, and a second threshold on the order of a hundred.

According to one embodiment, the metering of the number of activity sessions having a duration below the first threshold may comprise, upon the occurrence of a current activity session at or after the initial instant, allocating a first value to a binary indicator, for example, the logic value 1. The metering may further comprise, if the current activity session has a duration above or equal to the first threshold, the holding of the first value for the binary indicator in the course of the current activity session for a duration equal to the first threshold and then the allocating of a second value, for example, the logic value 0, to the binary indicator, and, if the current activity session has a duration below the first threshold, the first value for the binary indicator may be held after the end of the current activity session and at least until the occurrence of the following activity session. The metering may also include upon the occurrence of the following activity session and in the presence of the binary indicator having the first value, allocating the first value to a new binary indicator of higher rank than the rank of the binary indicator, and determining the number of binary indicators having the first value.

According to one embodiment, upon the occurrence of the following activity session and in the presence of the binary indicator having the second value, that is to say the logic value 0, the metering then may implement at least one of the above steps for the binary indicator of smallest rank and having the second value. In other words, when the last activity session has a duration above the threshold, the above steps of allocating and holding are recommenced with the oldest binary indicator which has the second logic value, for example, the value 0. This oldest binary indicator may be the same binary indicator as previously, or else an older indicator.

Moreover, when the duration of a current activity session is below the first threshold, the binary indicator considered may be preferably held at its first value for a chosen holding duration. Thus, for example, when the first value has been allocated to two binary indicators of successive ranks, the binary indicator of lowest rank is held at its first value for a holding duration expiring on completion of a residual duration after the other binary indicator has retaken the second value.

This residual duration may, for example, itself be equal to the first threshold. This makes it possible to further deter potential attackers. Indeed, if a hundred binary indicators having the first logic value, for example, the value 1, have been detected, it may be necessary to wait a duration equal to 100 times the first threshold, that is to say for example 100 minutes, before all the binary indicators drop back to the second logic value.

Generally, each activity session may start with the occurrence of an initialization signal for the device. The initialization signal may be designated by the person skilled in the art by the term "reset." This initialization signal may be generally followed by a startup or transition sequence preceding a working sequence, or operational sequence. This startup sequence is, for example, a "boot" sequence, that is to say an initial sequence making it possible to run executions of instructions which give rise to the loading of programs, the initialization of certain areas, and the enabling of optional peripherals.

Also, in the second mode of operation, the duration of the startup sequence may then be forced to a value above that of the startup sequence in the first mode of operation. In other words, in this degraded mode of operation, the device may therefore have to wait for a longer time before being operational when potentially suspicious behavior has been detected.

It is optionally possible to increase the duration of each new startup sequence as the number of indicators having the first value increases beyond the second threshold. Thus in this case, the greater the number of binary indicators having the logic value 1, the greater may be the duration of the startup sequence after each new initialization signal. This may ultimately make it possible to have a device with totally degraded performance rendering it totally ineffective for the application for which it is provided.

So as to be able to preserve the number of activity sessions having a duration below the first threshold even in the presence of the initialization signals, provision is advantageously made to store these binary indicators in a non-volatile memory, for example, a non-volatile memory of the electrically programmable and erasable type (EEPROM memory).

Another aspect is directed to an electronic device comprising processing means or a processor configured to operate in the course of activity sessions. The device also may comprise monitoring means or a monitor configured to meter, from an initial instant, the number of activity sessions having a duration below a first threshold, storage means or a memory configured to store at least one value representative of the number of activity sessions having a duration below a first threshold, and comparison means or a comparator configured to compare the number of sessions with a second threshold.

According to one embodiment in which the processor may be configured to operate in a first mode of operation in the course of activity sessions, the device furthermore may comprise control means or a controller configured to switch the processor to at least one second mode of operation different from the first mode of operation if the number of sessions is above the second threshold. According to one embodiment, the monitor may comprise management means or a management module. The management module may be configured to, upon the occurrence of a current activity session at or after the initial instant, a) allocate a first value to a binary indicator, and b) if the current activity session has a duration above or equal to the first threshold, hold the first value for the binary indicator in the course of the current activity session for a duration equal to the first threshold and then allocate a second value to the binary indicator, and if the current activity session has a duration below the first threshold, hold the first value for the binary indicator after the end of the current activity session and at least until the occurrence of the following activity session, and upon the occurrence of the following activity session in the presence of the binary indicator having the first value, allocate the first value to a new binary indicator of higher rank than the rank of the binary indicator. The cue may then comprise the binary indicators, and the monitor furthermore may comprise counting means or a counter configured to count the number of binary indicators having the first value.

According to one embodiment, the management module may be configured to, upon the occurrence of the following activity session and in the presence of the binary indicator having the second value, implement the allocating and holding steps for the binary indicator of smallest rank and having the second value. According to one embodiment, the management module may further be configured to, when the duration of a current activity session is below the first threshold, hold the binary indicator considered at its first value for a chosen holding duration.

According to one embodiment, when the first value has been allocated to two binary indicators of successive ranks, the management module may be configured to hold the binary indicator of smallest rank at its first value for a holding duration expiring on completion of a residual duration after the other binary indicator has retaken the second value. According to one embodiment, each activity session may start with the occurrence of an initialization signal for the system and comprises a startup sequence preceding a working sequence, and in the second mode of operation, the controller may be configured to force the duration of the startup sequence to a value above that of the startup sequence in the first mode of operation.

According to one embodiment, the controller may be configured to increase the duration of each new startup sequence as the number of binary indicators having the first value increases beyond the second threshold. The memory may comprise a non-volatile memory, for example, an electrically programmable and erasable non-volatile memory. The device may be an IC card (microcircuit card), for example, of the type of that intended to be used in a pay television system.

BRIEF DESCRIPTION OF THE DRAWINGS

Other advantages and characteristics of the present disclosure may be apparent on examining the detailed description of non-limiting modes of implementation and embodiments and the appended drawings in which.

DETAILED DESCRIPTION OF THE PREFERRED EMBODIMENTS

Figure 1:
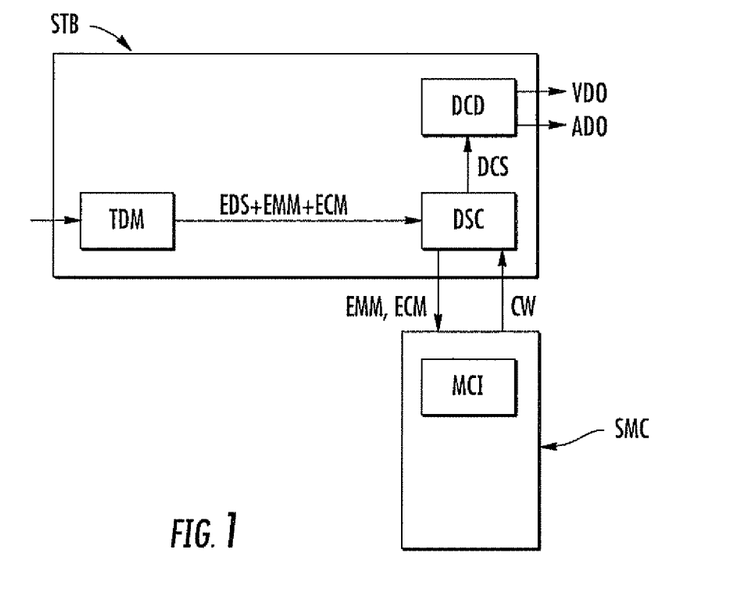
FIG. 1 schematically illustrates an embodiment of a decoder intended to cooperate with an IC card in a pay television application, according to the present disclosure.

An application of the present disclosure to a pay television system (PAY-TV) may now be described while referring to FIGS. 1 to 10, although the present disclosure is absolutely not limited to this type of application. In FIG. 1, the reference STB designates a decoder or "set top box" according to the term well known to the person skilled in the art.

The internal structure of such a decoder is typical. More precisely, it comprises, in particular, a tuning/demodulation block TOM receiving the audio and video data transmitted by the operator and delivering a stream of encrypted data EDS as well as messages EMM and ECM which are respectively encrypted messages defining the rights for one or more persons as well as encrypted messages containing a key or control word CW, in order to decrypt the video audio stream. The frequency of provision of the messages EMM depends on the operator.

All of this data stream is received and processed by a processing block DSC comprising, in particular, a descrambling module. The messages EMM and ECM are transmitted to a specific IC card SMC commonly designated by the person skilled in the art by the term "Pay-TV smartcard," comprising an integrated circuit MCI incorporating in particular a non-volatile memory, a random access memory, and a processor. The messages EMM representative of the card user's rights are stored in the non-volatile memory. Moreover, the messages ECM are temporarily stored in the random access memory in order to be decrypted by the processor so as to extract the corresponding key CW.

Figure 2:
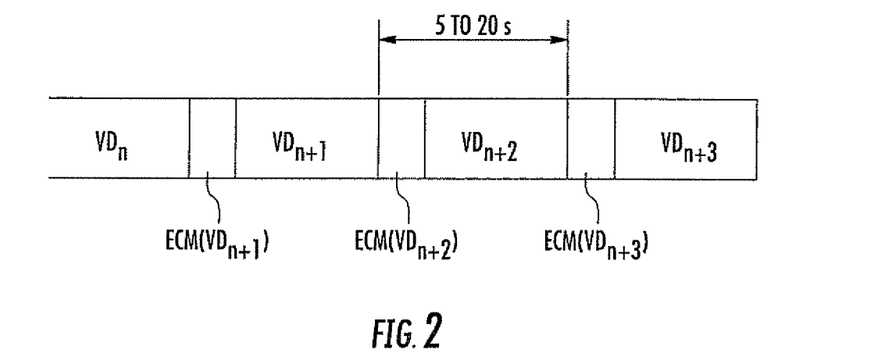
FIG. 2 illustrates an example of video data flows in a pay television application, according to the present disclosure.

As illustrated in FIG. 2, the video and audio stream is transmitted block-wise. Each block contains audio and video data $VD_i$ as well as at least the message ECM containing the key CW associated with the block considered, and optionally the messages ECM intended for subsequent blocks. The crypto period for transmitting the blocks is, for example, oN the order of 5 to 20 seconds.

Figure 3:
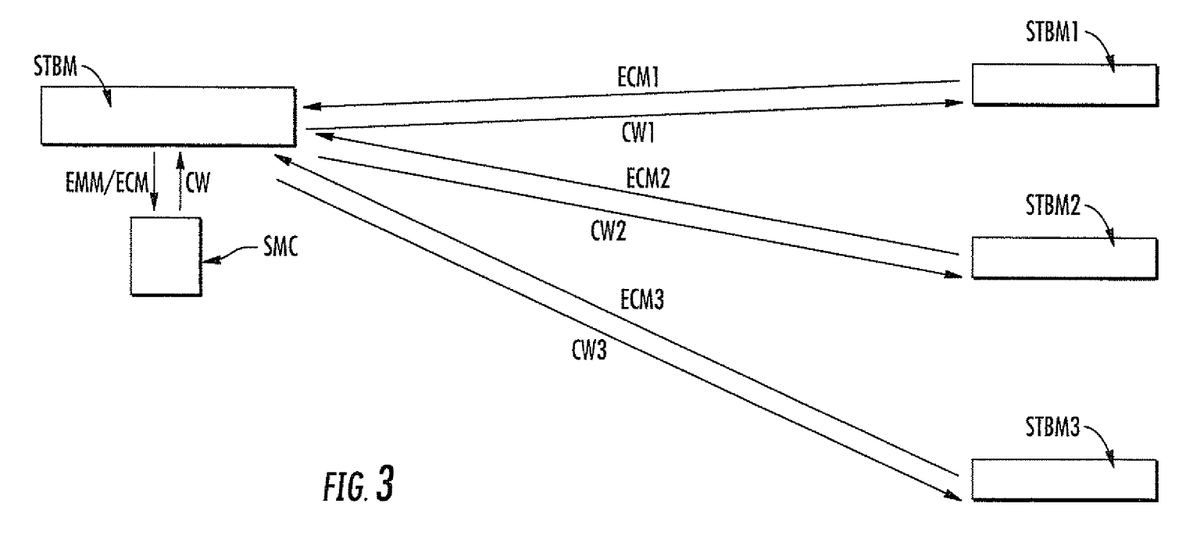
FIG. 3 schematically illustrates a configuration of a pay television system allowing fraudulent use of an IC card, according to the present disclosure.

The keys CW are delivered to the processing block DSC which performs the decryption of the video and audio stream and transmits a decrypted and compressed stream DOS to a video audio decoding block DCD which outputs the video cues VDO and audio cues ADO to the television. One way of diverting aN IC card usable in a pay television system from its normal use comprises performing card sharing. Such card sharing is performed with the aid of a system comprising several modified decoders STBM, STBM1, STBM2 and STBM3, and a single IC card SMC, which is a legitimately acquired card (FIG. 3).

A modified system such as this allows several users, here four users, to be able to watch different programs or indeed identical programs, by using a single card SMC and the rights associated with this card. More precisely, one of the decoders, for example, the decoder STBM, cooperates with the IC card SMC while the other decoders STBM1, STBM2 and STBM3 are connected to the decoder STBM, for example, an Internet link.

Thus, if in this example it is assumed that the card SMC contains rights making it possible to watch at least four different television stations or channels, the user of the decoder STBM can watch one program and the other three users of the decoders STBM1, STBM2 and STBM3 respectively, can simultaneously watch three other television channels, since the decoders have been modified in such a way that a dialogue can be engaged directly from the decoders STBMi with the card SMC so as to allow the exchange of the messages ECMi and the corresponding keys CWi so as to make it possible to view the corresponding programs.

Figure 4:
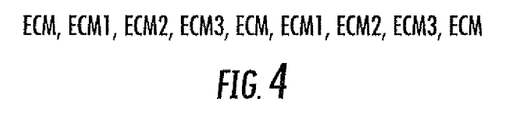
FIGS. 4 to 5 illustrate exchanges of data flows representative of potentially fraudulent behavior of the IC card usable in the system of FIG. 3, according to the present disclosure.

This fraudulent use of the card SMC may consequently manifest itself, as illustrated in FIG. 4, by identical repetitive sequences of different messages ECM. Such behavior is potentially fraudulent behavior. And it is known, for example, through the article by Francis and others, entitled "Countermeasures For Attacks on Satellite TV Cards Using Open Receivers" (Third Australasian Information Security Workshop 2005 (AISW2005)), which discloses that temporal observation of the behavior of the card with the aid of a memory makes it possible to detect suspicious behavior with the aim of stopping fraudulent use of the card.

Figure 5:
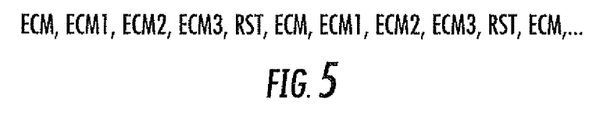

The fact that the various messages ECM received by the card are stored temporarily in the random access memory of the card, for the purposes of their decryption processing for example, is compatible with this temporal observation of the behavior of the card. The aforementioned article also teaches the use of re-initializations of the card by a fraudulent user so as to continue to use it fraudulently. Stated otherwise, as illustrated in FIG. 5, it would be possible to deliver to the card SMC, more or less regularly, initialization or "reset" signals RST which may be interposed between the various messages ECM and consequently reinitialize the content of the random access memory more or less regularly and this may disturb the temporal observation of the behavior of the card.

One approach for continuing to offer the possibility of temporally observing the behavior of the card would comprise storing the various messages ECM received not in a random access memory but in the non-volatile memory, for example, the EEPROM memory, of the card. Given the relatively short duration of the crypto period (on the order of 5 to 20 seconds), storage of all the messages ECM and ECMi in the non-volatile memory of the card can lead to a very high number of cycles of writing to the non-volatile memory, thereby risking short-term impairment of the operation thereof.

According to one aspect, instead of storing all the messages ECM, ECMi exchanged and performing statistical analysis, the present disclosure therefore makes provision to simply count the number of activity sessions (an activity session corresponds to the emission of an initialization signal RST which remains for example at a logic value "1" during this activity session) which have a duration below a first chosen threshold, for example, a minute, to store this number preferably in the non-volatile memory, so as to be able to preserve it despite the emission of the initialization signals, and to detect whether this number of short sessions is above a second threshold.

Indeed, whereas it is generally admitted that a certain number of initialization signals may be emitted during a certain period, in a normal use of the card SMC, too large a number of short activity sessions, that is to say too large a number of initialization signals emitted during a reduced time period, is generally synonymous with potentially suspicious behavior of the card. It is indeed rare for a user having properly acquired rights to spend his time "zapping" between four different channels in a quasi-regular manner over a significant time span.

A particularly simple though non-limiting way of counting the activity sessions having short durations, that is to say below the first threshold, envisages the use of binary indicators or semaphores, which may be stored in the non-volatile memory of the card. More precisely, referring now more particularly to FIG. 6, upon the occurrence of a current activity session, at or after an initial instant (this initial instant possibly being the instant marking the start of the first activity session or else any other reference instant from which one wishes to meter the number of short sessions), a first value, for example, the logic value 1, is allocated to a binary indicator Si. Thus, in the example of FIG. 6, upon the occurrence of the first activity session at or after the initial instant, the logic value 1 is assigned to a first binary indicator S1.

Figure 6:
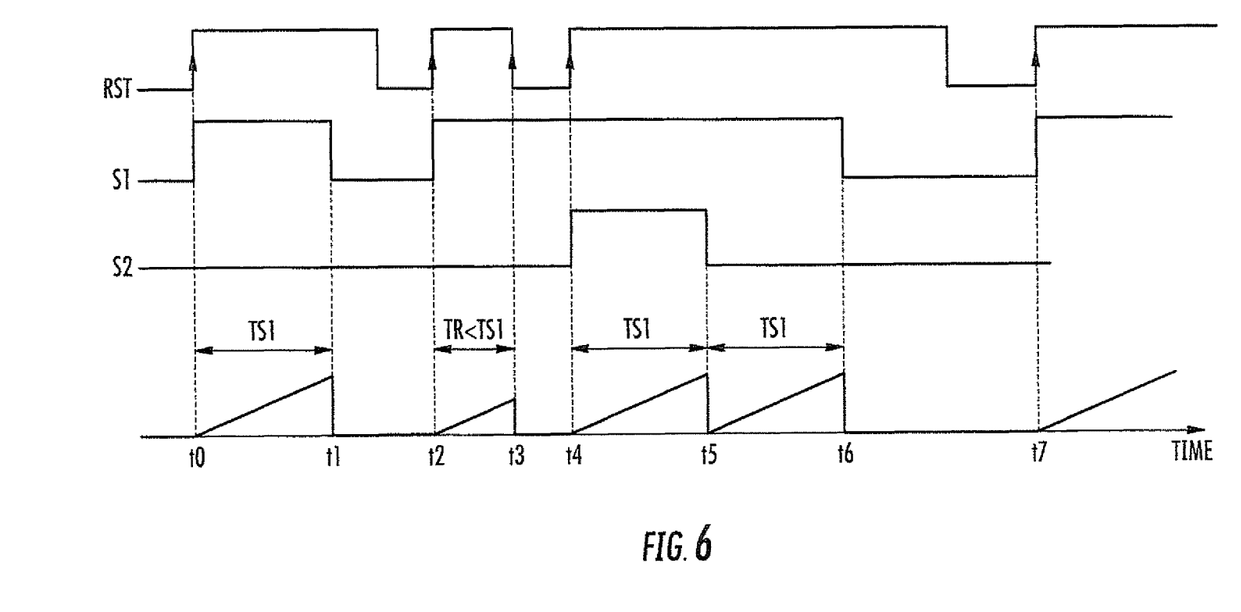
FIGS. 6 to 10 schematically illustrate modes of implementation and embodiment of a method and of a device according to the present disclosure making it possible to detect potentially suspicious behavior of this same device, for example the IC card used in the system of FIG. 3.

If the current activity session, in this instance the first activity session starting at the instant t0, has a duration above or equal to the first threshold TS1, this being the case here, the binary indicator S1 is held at its first value in the course of the current activity session for a duration equal to the first threshold TS1 and then a second value, in this instance the logic value 0, is allocated to the binary indicator S1.

On the other hand, if, as is the case for the second activity session, starting at the instant t2, the session has a duration TR below the first threshold TS1, then the first value is held, that is to say the logic value 1 for the binary indicator S1, at least until the occurrence of the following activity session, and preferably after the occurrence of this following activity session, as may be explained in greater detail hereinafter. Also, at the occurrence of the following activity session, that is to say here the one beginning at the instant t4, since the binary indicator of rank 1 S1 has the logic value 1, then the first logic value, that is to say the logic value 1, is again allocated to a new binary indicator, that is to say a binary indicator of higher rank, in this instance of rank 2, S2. Also, the same rules as those which have just been mentioned for the indicator S1 are applied to this new binary indicator S2.

Stated otherwise, if this new current activity session has a duration above TS1, this being the case here, the value of the semaphore S2 is made to drop back to 0 after the duration TS1 while this value 1 is held in the converse case, at least until the occurrence of the following activity session. The determination of the number of activity sessions having a duration below TS1 then amounts to counting at a given instant, the number of binary indicators or semaphores having the logic value 1.

Also, if this number is above a second threshold TH1 (FIG. 8), it is then possible to toggle the processor of the card SMC to a second mode of operation different from the first normal mode of operation of the card. This second mode of operation may be a degraded mode of operation as explained in greater detail hereinafter.

As shown, the current activity session starts at the instant t4, and the semaphore S2 took the value 1 for the duration TS1 and then dropped back to 0 since this activity session lasted longer than the duration TS1. Hence, upon the occurrence of the following activity session, that is to say that beginning at the instant t7, the same rules may be applied as those which have just been described, for the indicator of smallest rank and having the second value, that is to say the value 0.

In this instance, upon the occurrence of the following activity session which starts at the instant t7, the binary indicator of smallest rank and which has the second value 0 is the indicator of rank 1, that is to say the indicator S1. Consequently, upon the occurrence of this following activity session starting at the instant t7, the indicator S1 is again toggled to the value 1.

When the duration of a current activity session is below the first threshold TS1, the binary indicator considered is held at its first value for a chosen holding duration beyond the occurrence of the following activity session. Also, more particularly, when the first value, that is to say the value 1, has been allocated to two binary indicators of successive ranks, for example, the indicators S1 and S2, the binary indicator of lowest rank, in this instance the indicator S1, is held at its first value, i.e. the logic value 1, for a holding duration expiring on completion of a residual duration after the other binary indicator, in this instance the indicator S2, has retaken the second value. This residual duration is, in FIG. 6, that lying between the instants t5 and t6 and it is seen that it is only at the instant t6 that the binary indicator S1 retakes its value 0. In the example which is described here, this residual duration may be taken equal also to the first threshold TS1.

Stated otherwise, if the duration TS1 is 1 minute, it may be necessary to wait 1 minute after the binary indicator 52 has retaken its value 0, for the indicator S1 to itself retake its value 0. Such a measure further enhances the ability of the device to resist attacks aimed at using it fraudulently.

Indeed, if a fraudulent user realizes that after a certain number of initialization signals, the card switches to a degraded mode of operation, he could very well just before this number is reached, wait a duration above the duration TS1 before dispatching a new initialization signal. The approach disclosed herein may render such a counter-measure ineffective.

Figure 7:
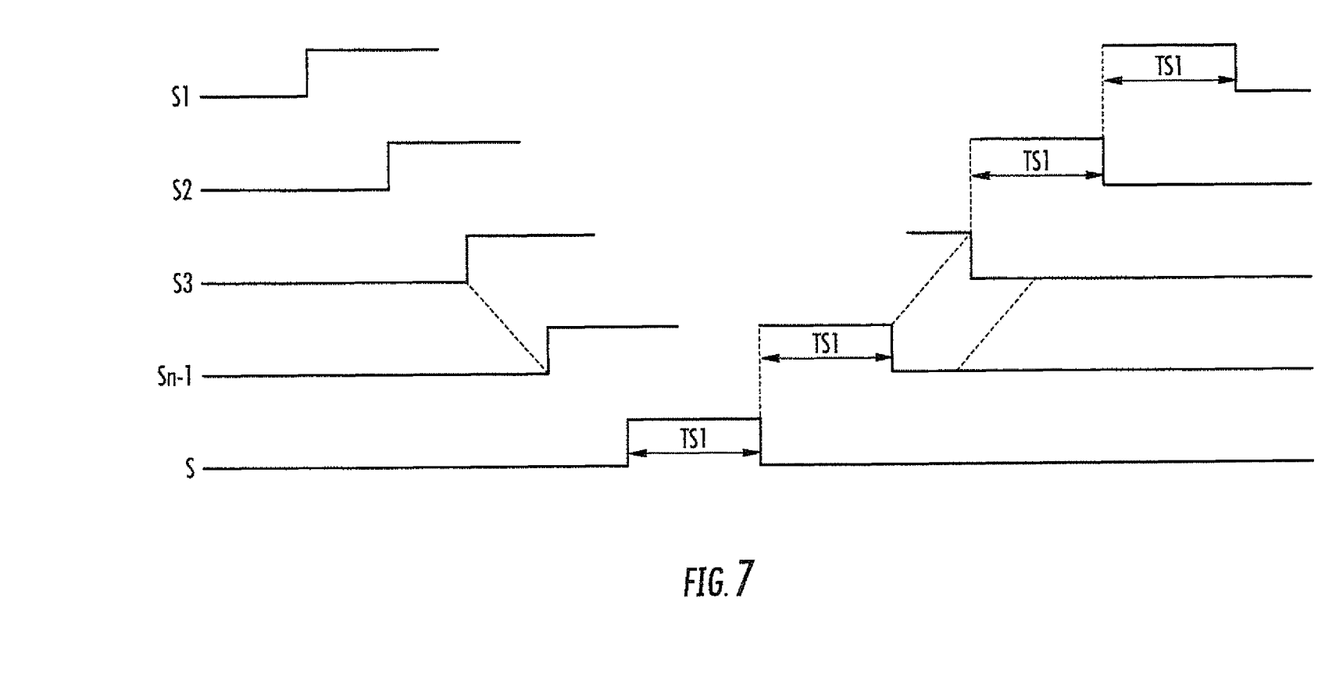

Indeed, if as illustrated in FIG. 7, n semaphores Si have each taken the logic value 1, it may be necessary to wait a duration equal to n×TS1 for the n semaphores to retake their logic value 0. If n is equal to 120, it may therefore be necessary to wait 2 hours for all the semaphores to have retaken the logic value 0 and for the semaphore counter to have been reset to 0.

Figure 8A:
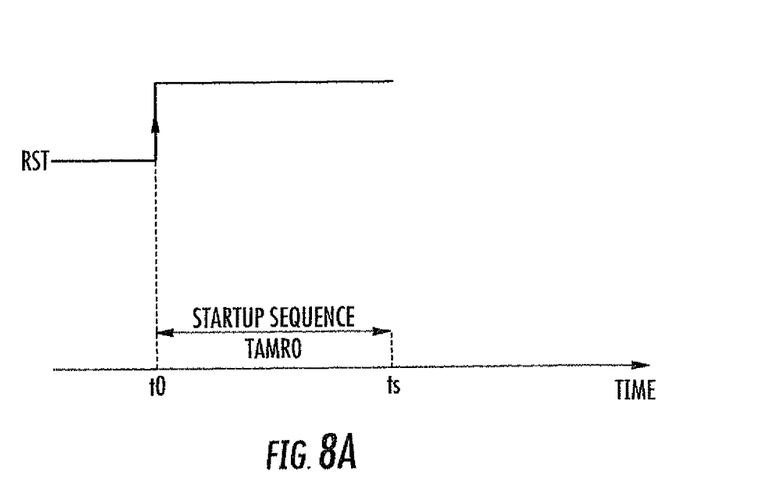
Figure 8B:
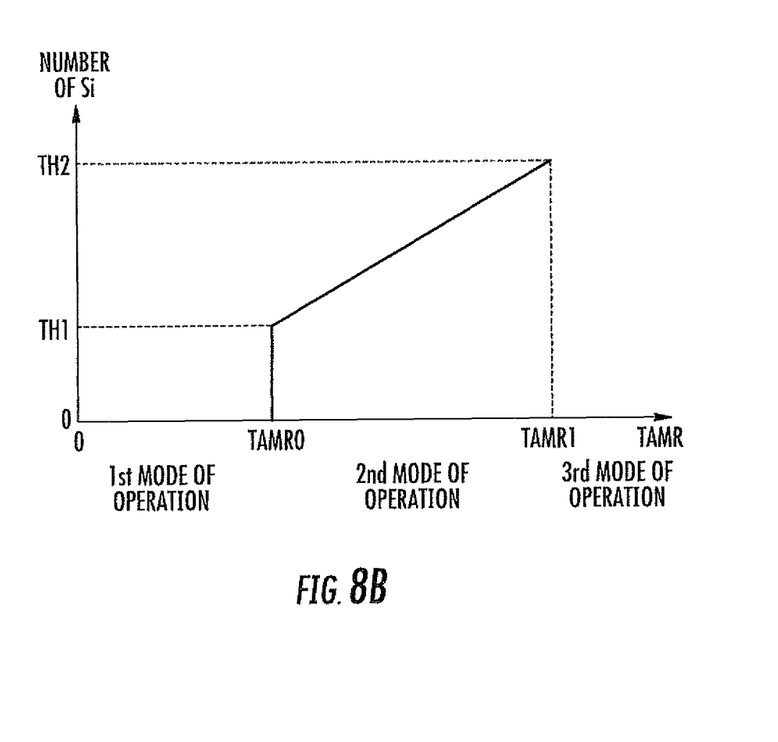

Generally, as illustrated in the top part of FIG. 8, an electronic device such as an IC card comprises, after the reception of the initialization signal RST, a startup sequence which is a transient sequence preceding the actual or operational working sequence of the device. This startup sequence may be, for example, a startup program or "boot" according to a term well known to the person skilled in the art.

Figure 9:
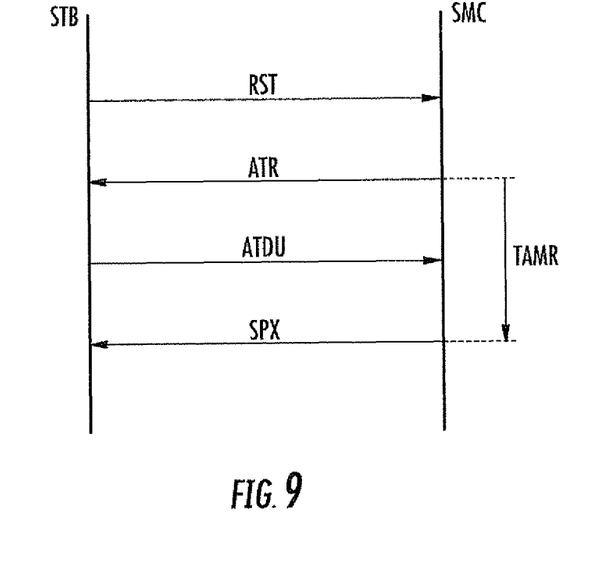

In an IC card application usable in a pay television system, the startup sequence or transient sequence may, as illustrated in FIG. 9, lie between the emission by the card SMC of a signal ATR acknowledging receipt of the initialization signal RST emitted by the STB decoder and the emission by the card SMC of a signal SPX indicating that it is ready to execute control instructions. This signal SPX is emitted after the reception by the card SMC of an APDU specific control signal. This transient sequence has a duration TAMR.

Returning now to FIG. 8, it is seen that the normal duration of a startup sequence when the card is in its normal mode of operation (first mode of operation) has a duration TAMR0. Also, as long as the number of semaphores remains below the threshold TH1, the card remains in its first mode of operation with a startup sequence still having the duration TAMR0.

On the other hand, as soon as the number of semaphores reaches the threshold value TH1, the card switches to a second mode of operation, different from the first mode of operation, and which may be a degraded mode of operation. In this regard, one way of degrading the mode of operation envisages increasing the duration of the startup sequence, doing so, for example, proportionately to an integer power of the number of semaphores having the value 1.

Thus, the more the number of semaphores increases beyond the threshold TH1, the longer the startup sequence may be, and the more time the card may take to be operational, that is to say to re-enter the actual working sequence. Also, of course, in particular in a pay television system, this increasingly long reaction time of the card may prevent pay channels from being watched under good reception conditions. It is also possible to envisage that beyond another threshold TH2, the card is switched to a third mode of operation which may be, for example, a mode in which the card may disable itself.

Figure 10:
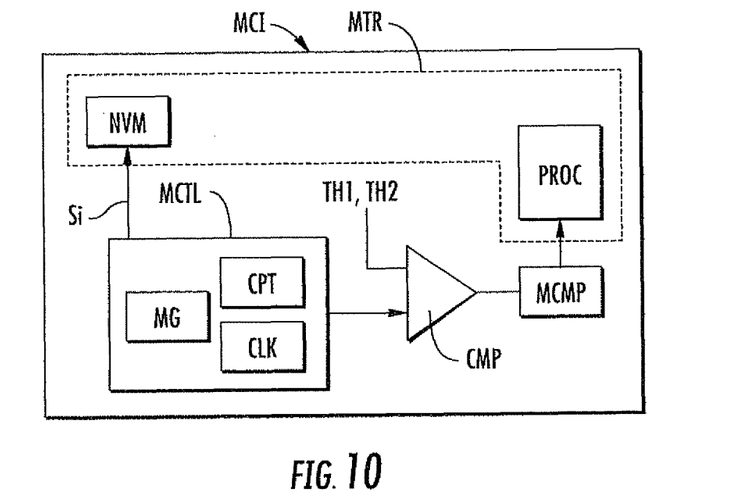

An exemplary integrated circuit MCI of a device or IC card, making it possible to implement the method which has just been described is illustrated schematically in FIG. 10. The integrated circuit MCI of the card comprises processor MTR generally including a microcontroller PROC and, in the present case, a non-volatile memory NVM intended in particular to store the rights acquired by the user of the card and conveyed by the message EMM. The circuit MCI also comprises a monitor MCTL configured to meter, on the basis of the initial instant, the number of activity sessions having a duration below the first threshold TS1, and a comparator CMP configured to compare this number of sessions with the threshold TH1, and optionally as indicated previously with another threshold TH2.

The controller MCMP is then configured to switch the processor MTR to at least one second mode of operation different from the first mode of operation if the number of sessions is above the threshold TH1. The monitor MCTL comprises a management module MG configured to perform the management of the semaphores Si as explained above.

Provision is also made for the monitor MCTL to comprise counting means or a counter CPT for counting the number of binary indicators Si having the first value, i.e. the logic value 1. Furthermore, a time base CLK, provided by a conventional circuit makes it possible to measure the time elapsed in the course of each activity session.

Some of these modules, such as for example the management module and the controller, may be realized in a software manner within specific software modules and/or by logic circuits. Moreover, although the monitor MCTL, the comparator CMP, and the controller MCMP have been represented in FIG. 10 outside the processor MTR, the latter could be realized actually within the processor, for example, actually within the microcontroller PROC.

The present disclosure, in the embodiments and modes of implementation which have just been described, therefore allows an electronic device, such as an IC card, to be able by itself to detect potentially suspicious operation and to be able by itself to take appropriate measures. That the, as indicated above, the present disclosure is not limited to pay television applications but applies to any electronic device configured to operate in the course of activity sessions, as is the case for IC cards in general.

Thus, among the possible attacks performed by fraudulent users to extract confidential data from a memory, for example, a protected memory of an IC card, may be cited attacks by so-called fault injection which envisage disturbing the operation and/or the content of the memory, for example, by means of radiation (laser, infrared, X rays, etc.). Also, these fault injections can lead to re-initializations of the card. Thus, repetitive re-initializations in a relatively short time span may be synonymous with such fault injection attacks and the detection of potentially suspicious behavior such as this of the card may allow the latter to switch to a degraded mode of operation with optional disabling of the card.

That which is claimed:

1. A method for detecting unauthorized operation of an integrated circuit (IC) card for a television set-top receiver operating based upon a plurality of activity sessions, the method comprising:
    in the IC card, measuring a time duration of each activity session;
    in the IC card, measuring a number of activity sessions each having a time duration below a first threshold, each activity session starting with an initialization signal and associated with a respective channel; and
    in the IC card, comparing the number of activity sessions having the time duration below the first threshold with a second threshold.

2. The method according to claim 1 further comprising operating the IC card in a first mode of operation, and switching the IC card to a second mode of operation different from the first mode of operation if the number of activity sessions having the time duration below the first threshold is above the second threshold.

3. The method according to claim 2 wherein the measuring comprises:
    during a current activity session, at least performing
        allocating a first value to a binary indicator,
        if the current activity session has a time duration greater than or equal to the first threshold, holding the first value for the binary indicator during the current activity session for a period equal to the first threshold and then allocating a second value to the binary indicator, and
        if the current activity session has a time duration below the first threshold, holding the binary indicator at the first value after the end of the current activity session and at least until the occurrence of the following activity session;
    upon the occurrence of the following activity session with the binary indicator having the first value, allocating the first value to a new binary indicator of greater rank than a rank of the binary indicator; and
    determining of a number of binary indicators having the first value.

4. The method according to claim 3 wherein the measuring comprises upon the occurrence of the following activity session with the binary indicator having the second value, performing the allocating and holding for the binary indicator of lowest rank with the second value.

5. The method according to claim 3 wherein the measuring further comprises when the time duration of the current activity session is below the first threshold, holding the binary indicator at the first value for a holding period.

6. The method according to claim 5 wherein when the first value has been allocated to at least two binary indicators of successive ranks, the binary indicator of lowest rank is held at first value for the holding period expiring on completion of a residual period after the other binary indicator has retaken the second value.

7. The method according to claim 3 wherein each activity session comprises a startup sequence, and a working sequence thereafter; and wherein when in the second mode of operation, a time duration of the startup sequence is forced to a value greater than that of the startup sequence in the first mode of operation.

8. The method according to claim 7 wherein the time duration of each new startup sequence is increased as the number of binary indicators having the first value increases beyond the second threshold.

9. The method according to claim 1 further comprising storing in a non-volatile memory the number of activity sessions having the time duration below the first threshold.

10. The method according to claim 9 further comprising storing in an electrically programmable and erasable non-volatile memory the number of activity sessions having the time duration below the first threshold.

11. An integrated circuit (IC) for an IC card for a television set-top receiver comprising:
    a processor configured to operate based upon a plurality of activity sessions, each activity session starting with an initialization signal and associated with a respective channel;
    a monitor circuit configured to
        measure a time duration of each activity session, and
        measure, in the plurality of activity sessions, a number of activity sessions having a time duration below a first threshold;
    a memory configured to store a value representative of the number of activity sessions having the time duration below the first threshold; and
    a comparator configured to compare the number of sessions having the time duration below the first threshold with a second threshold.

12. The IC according to claim 11 wherein said processor is configured to operate in a first mode of operation; and further comprising a controller configured to switch said processor to a second mode of operation different from the first mode of operation if the number of activity sessions having the time duration below the first threshold is above the second threshold.

13. The IC according to claim 11 wherein said monitor circuit comprises:
    a management circuit configured to:
        during a current activity session, at least perform
            allocating a first value to a binary indicator,
            if the current activity session has a time duration greater than or equal to the first threshold, holding the first value for the binary indicator during the current activity session for a period equal to the first threshold and then allocating a second value to the binary indicator, and
            if the current activity session has a time duration below the first threshold, holding the binary indicator at the first value after the end of the current activity session and at least until the occurrence of the following activity session, and upon the occurrence of the following activity session with the binary indicator having the first value, allocating the first value to a new binary indicator of greater rank than a rank of the binary indicator; and a counter configured to count the number of binary indicators having the first value.

14. The IC according to claim 13 wherein said management circuit is configured to upon the occurrence of the following activity session with the binary indicator having the second value, perform the allocating and holding for the binary indicator of lowest rank with the second value.

15. The IC according to claim 13 wherein said management circuit is configured to when the time duration of the current activity session is below the first threshold, hold the binary indicator at the first value for a holding period.

16. An integrated circuit (IC) card for a television set-top receiver comprising:

a processor configured to
operate based upon a plurality of activity sessions, each activity session starting with an initialization signal and associated with a respective channel,
measure a time duration of each activity session, and
measure a number of activity sessions having a time duration below a first threshold;

a memory configured to store a value representative of the number of activity sessions having the time duration below the first threshold; and a comparator configured to compare the number of sessions having the time duration below the first threshold with a second threshold.

17. The IC card according to claim 16 wherein said processor is configured to operate in a first mode of operation and to switch said processor to a second mode of operation different from the first mode of operation if the number of activity sessions having the time duration below the first threshold is above the second threshold.

18. The IC card according to claim 16 wherein said processor comprises:

a management circuit configured to:
during a current activity session, at least perform
allocating a first value to a binary indicator,
if the current activity session has a time duration greater than or equal to the first threshold, holding the first value for the binary indicator during the current activity session for a period equal to the first threshold and then allocating a second value to the binary indicator, and
if the current activity session has a time duration below the first threshold, holding the binary indicator at the first value after the end of the current activity session and at least until the occurrence of the following activity session, and
upon the occurrence of the following activity session with the binary indicator having the first value, allocating the first value to a new binary indicator of greater rank than a rank of the binary indicator; and
a counter configured to count the number of binary indicators having the first value.

19. An integrated circuit (IC) for a television set-top receiver comprising:

a processor configured to
operate based upon a plurality of activity sessions, each activity session starting with an initialization signal and associated with a respective channel,
measure a time duration of each activity session, and
measure a number of activity sessions having a time duration below a first threshold;

a memory configured to store a value representative of the number of activity sessions having the time duration below the first threshold; and a comparator configured to compare the number of sessions having the time duration below the first threshold with a second threshold.

20. The IC according to claim 19 wherein said processor is configured to operate in a first mode of operation and to switch said processor to a second mode of operation different from the first mode of operation if the number of activity sessions having the time duration below the first threshold is above the second threshold.

21. The IC according to claim 19 wherein said processor comprises:

a management circuit configured to:
during a current activity session, at least perform
allocating a first value to a binary indicator,
if the current activity session has a time duration greater than or equal to the first threshold, holding the first value for the binary indicator during the current activity session for a period equal to the first threshold and then allocating a second value to the binary indicator, and
if the current activity session has a time duration below the first threshold, holding the binary indicator at the first value after the end of the current activity session and at least until the occurrence of the following activity session, and
upon the occurrence of the following activity session with the binary indicator having the first value, allocating the first value to a new binary indicator of greater rank than a rank of the binary indicator; and
a counter configured to count the number of binary indicators having the first value.

22. The IC according to claim 15 wherein when the first value has been allocated to two binary indicators of successive ranks, said management circuit is configured to hold the binary indicator of lowest rank at the first value for the holding period expiring on completion of a residual period after the other binary indicator has retaken the second value.

23. The IC according to claim 13 wherein each activity session comprises a startup sequence, and a working sequence thereafter; and wherein when in the second mode of operation, said controller is configured to force a time duration of the startup sequence to a value above that of the startup sequence in the first mode of operation.

24. The IC according to claims 17 wherein said controller is configured to increase the time duration of each new startup sequence as the number of binary indicators having the first value increases beyond the second threshold.

25. The IC according to claim 11 wherein said memory comprises a nonvolatile memory.

26. The IC card according to claim 25 wherein said nonvolatile memory comprises an electrically programmable and erasable nonvolatile memory.

* * * * *